(12) United States Patent
Shahoian et al.

(10) Patent No.: US 6,304,091 B1
(45) Date of Patent: Oct. 16, 2001

(54) ABSOLUTE POSITION SENSING BY PHASE SHIFT DETECTION USING A VARIABLE CAPACITOR

(75) Inventors: Erik J. Shahoian, San Leandro; Christopher J. Hasser, San Jose; Bruce M. Schena, Menlo Park, all of CA (US)

(73) Assignee: Immersion Corporation, San Jose, CA (US)

(*) Notice: Subject to any disclaimer, the term of this patent is extended or adjusted under 35 U.S.C. 154(b) by 0 days.

(21) Appl. No.: 09/248,177

(22) Filed: Feb. 9, 1999

Related U.S. Application Data

(60) Provisional application No. 60/074,229, filed on Feb. 10, 1998.

(51) Int. Cl.[7] .................................................. G01R 27/26
(52) U.S. Cl. ...................... 324/662; 324/660; 324/661; 324/658; 324/683
(58) Field of Search ..................... 324/662, 663, 324/661, 658, 683, 686, 660; 340/870.25, 870.37; 361/292

(56) References Cited

U.S. PATENT DOCUMENTS

| 5,146,566 | 9/1992 | Hollis, Jr. et al. ................. 395/275 |
| 5,184,319 | 2/1993 | Kramer ................................ 364/806 |
| 5,402,680 | * 4/1995 | Korenaga ............................ 324/662 |
| 5,414,337 | 5/1995 | Schuler ................................ 318/561 |
| 5,576,704 | 11/1996 | Baker et al. ........................... 341/20 |
| 5,589,828 | 12/1996 | Armstrong .............................. 341/20 |
| 5,625,576 | 4/1997 | Massie et al. ........................ 364/578 |
| 5,629,594 | 5/1997 | Jacobus et al. .................... 318/568.11 |
| 5,694,153 | 12/1997 | Aoyagi et al. ........................ 345/161 |
| 5,724,068 | 3/1998 | Sanchez et al. ...................... 345/161 |
| 5,734,373 | 3/1998 | Rosenberg et al. .................. 345/161 |
| 5,767,839 | 6/1998 | Rosenberg ........................... 345/161 |
| 5,790,108 | 8/1998 | Salcudean et al. .................. 345/184 |
| 5,844,673 | 12/1998 | Ivers ..................................... 356/138 |
| 5,936,410 | * 8/1999 | Dunfield et al. ..................... 324/662 |
| 6,025,726 | * 2/2000 | Gershenfeld et al. ............... 324/671 |
| 6,118,283 | * 9/2000 | Cripe .................................... 324/660 |

OTHER PUBLICATIONS

Baxter, L., *Capacitive Sensors, Design and Applications*, Chapters 1–10 and 18, IEEE Press, 1997.

* cited by examiner

*Primary Examiner*—Safet Metjahic
*Assistant Examiner*—Anjan K. Deb
(74) *Attorney, Agent, or Firm*—James R. Riegel; Guy V. Tucker

(57) ABSTRACT

A low-cost, high-resolution capacitive position sensor is provided using a variable capacitor. A vane moves parallel to a stator, where a dielectric is interposed between vane and stator, such that the vane overlaps at least a portion of the stator, creating a capacitance that varies as the vane moves relative to the fixed stator. The capacitor circuit outputs a signal having a phase shift relative to an input driver signal based on the relative positions of the vane and stator. The phase-shifted signal is used to derive the absolute position of the vane with respect to the stator. Two or more stator can be provided to provide two phase-shifted signals and a difference signal free of common mode effects. Enhanced embodiments include interdigitated stator portions for greater sensing resolution, and/or a two or three-pole filter to double or triple the dynamic range of the sensor.

31 Claims, 11 Drawing Sheets

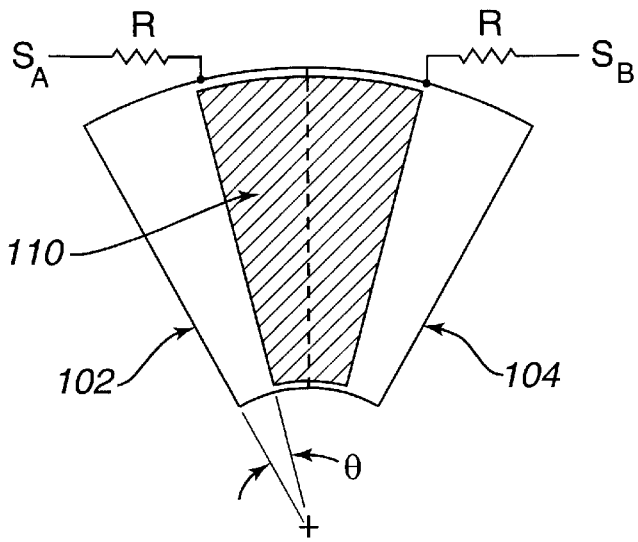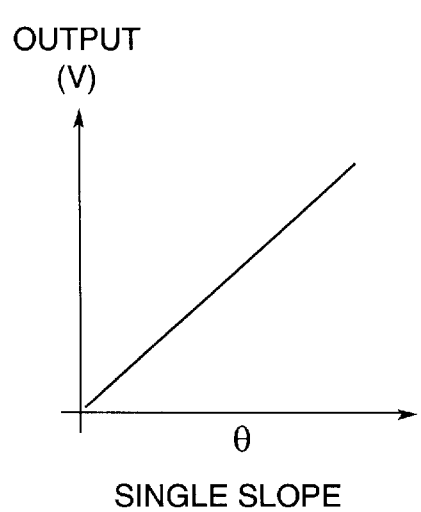
Fig. 5a
Fig. 5b
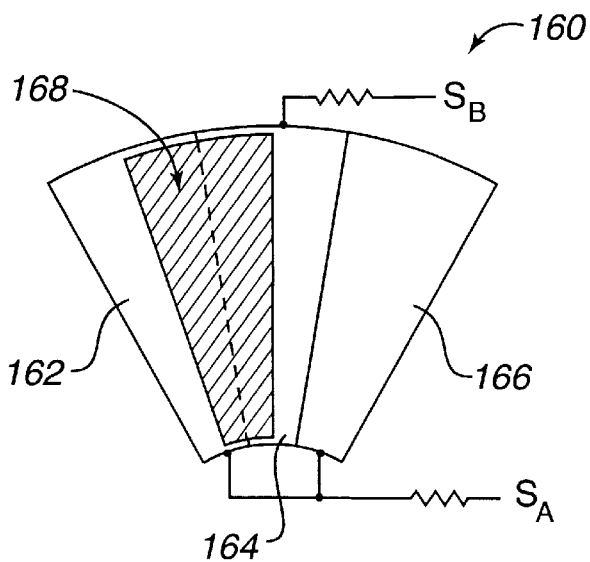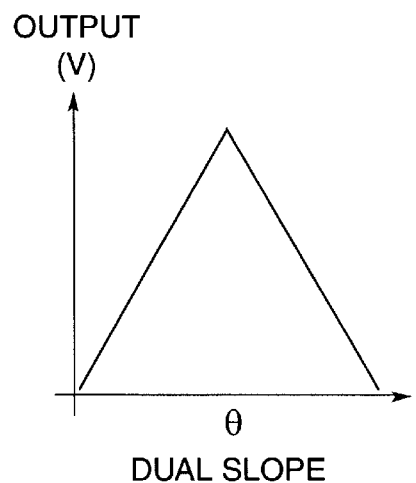
Fig. 5c
Fig. 5d

ABSOLUTE POSITION SENSING BY PHASE SHIFT DETECTION USING A VARIABLE CAPACITOR

CROSS REFERENCE TO RELATED APPLICATIONS

This application claims the benefit of provisional application serial No. 60/074,229, filed Feb. 10, 1998 by Erik Shahoian, Christopher Hasser, and Bruce M. Schena, entitled "Absolute Position Sensing by Phase Shift Detection of Variable Capacitor Array," which is incorporated herein by reference.

BACKGROUND OF THE INVENTION

This invention relates generally to sensing devices, and more particularly to absolute position sensing devices with high sensing resolution.

Position sensors are used in a variety of devices to allow electrical systems to sense motion or position of moving objects and components. For example, one use of position sensors is in computer interface devices, which allow a user to provide input to a computer system to manipulate computer-generated objects and environments and to instruct the computer to perform tasks. Computer interface devices use position sensors to detect a user's input to the computer system. For interface devices such as joysticks and mice, position sensors determine the location of a user manipulandum within a workspace in particular degrees of freedom. The position of the manipulandum is used by the computer to control a cursor or otherwise manipulate a computer environment. Force feedback interface devices also use input from position sensors in the determination of an output force, which is then output on the manipulandum by motors or other actuators in the interface device. Position sensors are also used in a variety of other applications, such as sensing the position of a rotary knob. Traditional position sensors used in computer interface devices and other devices include analog potentiometers and digital encoders.

Sensors have a sensing resolution, which determines the amount of motion or displacement detectable by the sensor; for example, a larger sensing resolution allows the sensor to detect smaller increments of movement. One problem with existing position sensors is that resolution of the sensors is limited by cost considerations. For example, digital encoders can provide precise position readings but have a resolution limited by the spacing of encoder divisions (e.g., slots or marks) whose movement is detected by the sensor. The higher the resolution, the more closely spaced the encoder divisions must be, requiring high precision and greater cost to produce the sensor. This can present a problem for interface devices that require very high precision, such as force feedback interface devices, yet are sold as low-cost, high-volume consumer products.

Another type of position sensor is a capacitive sensor. These types of sensors typically detect changes in position by measuring capacitance between two relative-moving pieces or components, i.e. the charge of the capacitor is measured. These types of conventional capacitive sensors rely on charge measurement electronics which are cost prohibitive for high volume consumer products and typically suffer from poor signal to noise performance, and thus may not be suitable for many applications. Other types of capacitive sensors measure a frequency of an output signal from the sensor, and determine a position of moving components based on the sensed frequency. However, these types of sensors also suffer from high-cost components that read the output signal frequency.

SUMMARY OF THE INVENTION

The present invention provides a high-resolution absolute position sensor. A variable capacitor provides changes in phase of an AC signal, allowing low cost and high resolution position sensing.

More particularly, a capacitive position sensor and method of the present invention includes a stator and a vane and a dielectric provided between the vane and stator. The vane moves parallel to the stator such that the vane overlaps at least a portion of the stator, creating a capacitance that varies as the vane moves. An input driver signal having an input frequency is input to a circuit including the capacitor, and the circuit outputs a signal having a phase shift with reference to the driver signal and based on the relative positions of the vane and stator. The phase-shifted signal is used to derive the absolute position of the vane with respect to the stator. The phase shift is based on a degree of overlap of said stator by said vane, thereby indicating a position of said vane relative to said stator. Preferably, the stator and vane are approximately planar in shape, and the stator can be provided on a printed circuit board for low cost production. Linear or rotary motion of the vane can be sensed.

A circuit is included in (or coupled to) the sensor that receives the phase shifted signal and outputs a pulse width modulated signal which is linearly proportional to the position of the vane with respect to the stator. For example, the circuit may include an XOR gate. A filter can also be provided to receive the pulse width modulated signal and produce a filtered output signal. The filtered signal can be measured with a microprocessor to resolve a position of the moving member.

In a preferred embodiment, two stators are provided, where the second stator is positioned adjacent to the first stator approximately in the same plane, and where the vane overlaps both of the stators during its movement. A circuit is connected to each stator to provide two phase-shifted signals; the second signal increases in amplitude while the first signal decreases in amplitude, and the signals are subtracted to provide a difference signal free of common mode effects.

The sensor can be used, for example, to detect the position of a user manipulandum in a computer input device that is coupled to the vane and moved by a user, such as a mouse or joystick. A mechanical linkage can be positioned between the user manipulandum and the vane; the linkage can include multiple members rotatably coupled to each other.

In another embodiment, four stators are provided in a stator array and a circular vane is moved parallel to the stators to provide four output signals which are subtracted to provide a two-degree-of-freedom position. In yet another embodiment, a stator is comprised of first, second and third interdigitated stator sections positioned adjacent to each other in a range of movement of the vane. A greater sensing resolution can be provided in the same movement range of the vane. In another embodiment, multiple variable capacitors are provided in a multi-pole circuit, which increases the dynamic range of the sensor.

A method for sensing the position of a moving member provides an input signal, shifts a phase of the frequency of the input signal by inputting the input signal to an RC circuit, and provides the phase-shifted signal to a phase detector circuit that outputs a pulse width modulated signal. The modulated signal is linearly proportional to the position a plate of a capacitor in the RC circuit with respect to a different plate of the capacitor.

The apparatus of the present invention provides a high resolution absolute position sensor. Since phase shift is detected rather than charge or frequency, the capacitive sensor includes components that are easy to manufacture and thus are low cost. The sensor produces a signal having low interference or noise and little error. The high resolution of the sensor allows the sensor to be cost-effectively used in interface devices that require high sensing precision, such as force feedback devices.

These and other advantages of the present invention will become apparent to those skilled in the art upon a reading of the following specification of the invention and a study of the several figures of the drawing.

BRIEF DESCRIPTION OF THE DRAWINGS

FIG. 2b is a phasor diagram showing an impedance vector Z and phase shift θ for the capacitor in the circuit of FIG. 2a;

FIG. 2c is a time-based graph illustrating the phase shift θ for the RC circuit of FIG. 2a;

FIG. 3b is a graph illustrating the differential measurement of two output signals of the circuit of FIG. 3a;

FIG. 3f illustrates a circuit layout on a printed circuit board to implement the circuit shown in FIG. 3a;

FIGS. 5a–5d illustrate the embodiment of FIG. 3c and another embodiment of the present invention in which interdigitated stator portions are provided;

FIG. 7a is a schematic diagram of a RC low-pass circuit as used in the embodiment of FIG. 2a;

FIGS. 7b and 7c are a phase diagram and an amplitude diagram, respectively, for the circuit of FIG. 7a;

FIG. 9b illustrates the motion of each vane over its corresponding stator and the overlapping areas in the sensor embodiment of FIG. 9a;

DETAILED DESCRIPTION OF THE PREFERRED EMBODIMENTS

The absolute position sensor of the present invention is a relatively low-cost capacitive sensor capable of providing a high sensing resolution comparable to resolutions attained by high cost optical encoder sensors. As used herein, the sensing resolution of a sensor determines the amount of motion or displacement detectable by the sensor; for example, a larger sensing resolution allows the sensor to detect smaller increments of movement. Herein, the term "absolute position sensor" is intended to refer to a sensor having a fixed sensed frame in which a position with respect to the entire frame is sensed. This is in contrast to a "relative position sensor" which senses only changes in position, i.e. a position with respect to the last position sensed.

Figure 1:
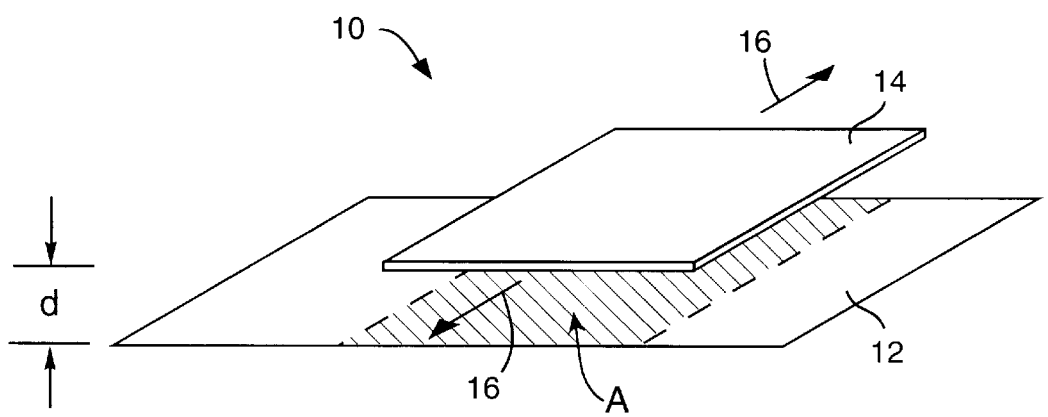
FIG. 1 is a diagrammatic view of a capacitor having two plates.

FIG. 1 is a perspective view of a generalized capacitor 10. Two parallel electrically conductive plates 12 and 14 are separated by a distance d and have a dielectric material 15 between them (a sheet of dielectric material can be coupled to either plate), forming a capacitor whose capacitance value depends on the physical separation of the plates 12 and 14, the dielectric constant of the material between the plates, and the area of the plates. If the plates are of unequal area or are shifted relative to each other while parallel, the capacitance is determined by the area of one plate projected onto the other when viewing the plates at a direction perpendicular to the planes of the plates, i.e., the "overlap" area A between the plates. The capacitance is given by:

$$C=(n-1)*A*K/d$$

where n is the number of plates, A is the overlapped area, K is the dielectric constant of the material between the plates, and d is the plate separation. A variable capacitor thus provides a variable capacitance based on the current size of the overlap area A, where the plates can be shifted relative to each other to change the size of area A, as indicated by arrows 16.

A practical variable capacitor can be constructed using printed circuit board (PCB) fabrication processes to form a first plate 12 of the capacitor from a square or rectangular pad of copper surrounded by the insulating board material. The second plate 14, a moveable plate of conductive material, is separated from the copper pad of the first plate on the PCB by dielectric material such as Kapton, Teflon® film, or tape, where the dielectric can be attached to either plate 12 or 14. As the moveable plate 14 is translated parallel to the PCB 12, the resulting overlap area changes. As a convention, the first (fixed) plate 12 is called the "stator" and the second (movable) plate 14 is called the "vane." In other embodiments, the PCB plate 12 can be moved while the plate 14 is fixed.

In one preferred embodiment, a simple square inch of copper trace (e.g. on a PCB) is provided as the stator 12 and another square inch of copper trace (e.g., on a separate plate) is provided as the vane 14, where the plates are separated by 0.003 inch thick Teflon tape, to form a variable capacitor with a large capacitance range. Preferably, the dielectric is physically coupled to the vane and is pressed or contacted against the stator to reduce the air gap to a small, precise distance between dielectric and stator. Different types of mechanisms or supports may be used to provide a precise gap between vane and stator. The capacitance is over 100 picofarads (pF) when the plates are maximally overlapped, and less than 10 pF when they are minimally overlapped. A capacitance within these two range limits is provided for different amounts of overlap.

Figure 2A:
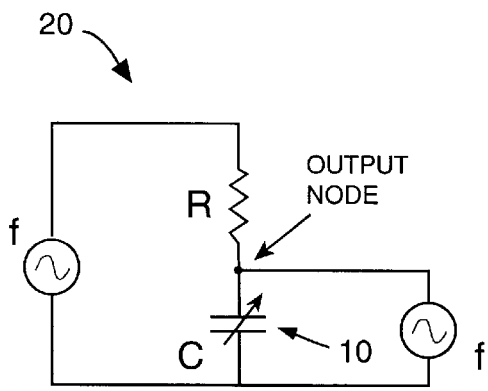
FIG. 2a is a schematic diagram of an RC sensor circuit of the present invention.

If the variable capacitor is arranged in a circuit such that it is driven by an AC signal, e.g., a sine wave or square wave, then the instantaneous current through the capacitor will vary as a function of the capacitor's impedance at that signal frequency. If the circuit contains a resistor R, then the RC circuit driven by the signal provides an altered output signal at the junction of the resistor and the capacitor. FIG. 2a illustrates an RC sensor circuit 20 and the output (common) node at which the altered signal is present, where capacitor 10 and resistor R are coupled in the circuit as shown, and source wave generators 22 input a driving signal.

The capacitive reactance of a capacitor (in ohms) is a function of driving signal frequency and capacitance, where the reactance $X_c$ is given by $X_c=1/(2*pi*f*C)$, where f is the driving signal frequency and C is the capacitance. If either the capacitance or the frequency of the driving signal is varied, the reactance will change. As capacitive reactance changes, the amplitude and the phase of the signal present at the common node of the RC circuit changes. Variable capacitance results in a phase variation or shift between the driving signal and the output signal present at the RC output node.

Figure 2B:
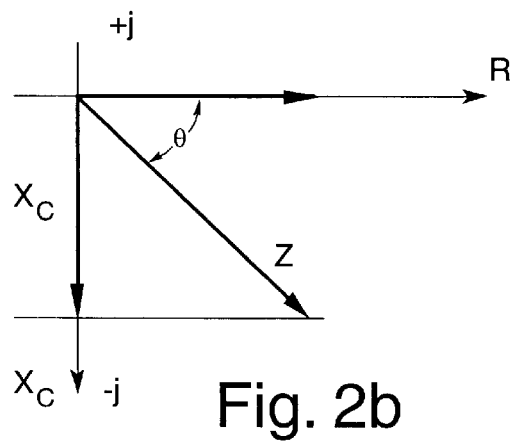
Figure 2C:
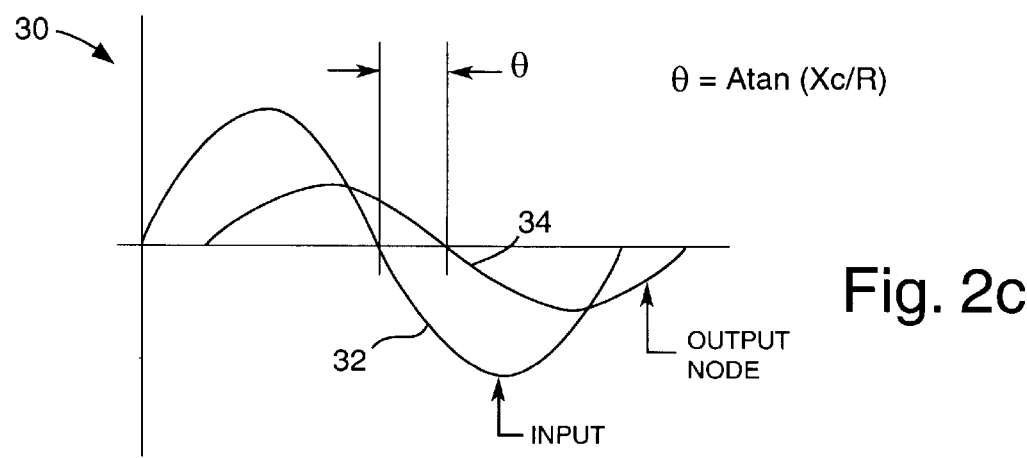

This phase shift is described by $\theta=\text{Arctan}(X_c/R)$, where $X_c$ is capacitive reactance (in Ohms) and R is the resistance value. As the vane 14 is moved, the resultant change in $X_c$ phase shifts the RC node signal by $\theta$ degrees. $\theta$ has a practical range of 60 degrees for the real world components used in performed tests of preferred embodiments. FIG. 2b is a phasor diagram showing an impedance vector Z and phase shift $\theta$ for the capacitor and FIG. 2c is a time-based graph 30 illustrating the phase shift $\theta$ for the RC circuit of FIG. 2a, where curve 32 illustrates the signal at the input node of circuit 20 and curve 34 illustrates the signal at the output node of the circuit.

It should be noted that the phase of the RC node signal is a non-linear Arctan function. Changing the R value in the circuit alters the amount of phase shift provided from a given absolute change in $X_c$. R thus determines where the phase is located on the Arctangent output node curve 34.

An electronic circuit allows the phase shift $\theta$ to be transformed into a signal suitable for measurement by an appropriate electronic device, such as a microprocessor or other digital device for reading the signal as a digital signal, or alternatively an A/D converter or other analog device for reading the signal as a time-varying analog signal. In both cases the signals are responsive to the absolute position of the vane 14 with respect to the stator 12.

In a preferred embodiment, the sinusoidal or square wave signals produced by the capacitive sensor are read as digital signals. Low cost phase detection of sinusoidal signals and filtered square wave signals can be accomplished by a phase detection stage of the sensor circuit, which for example can include a digital logic integrated circuit. One preferred logic device for phase detection is the exclusive OR (XOR) gate. The XOR logic gate has the unique property in that it only produces an output when the inputs A and B are of different logical states:

| A | B | OUTPUT |
|---|---|--------|
| 0 | 0 | 0 |
| 1 | 0 | 1 |
| 0 | 1 | 1 |
| 1 | 1 | 0 |

If two in-phase square waves of the same frequency and duty cycle are input to the XOR gate, the output of the gate will remain low. If the phase between the two inputs changes, then the output will produce a signal whose frequency is twice that of the inputs and whose duty cycle is directly proportional to the phase difference. The XOR output is a pulse width modulated signal: a square wave with a variable duty cycle responsive to phase difference of the inputs. In a preferred embodiment, one of the inputs is the RC circuit driving signal and the other is the phase shifted RC output node signal. The digital signal output from the XOR gate can be fed, for example, directly into a microcontroller for measurement.

A problem with the XOR gate is that, unlike more costly phase detection devices, it will only produce meaningful output if the inputs have reasonably distinct edges. This is due to the nature of logic devices which may make state transitions at different input voltages. There is variation in different XOR gates and probably some variation between gates even in a single package containing multiple gates. Sine wave signals and rounded-off square wave signals thus may not interface well with XOR gates; the XOR gate requires digital signals.

In one embodiment, the digital signals required by the XOR phase detector can be provided by an op-amp comparator which couples the RC sensor circuit stage to the phase detection stage. The op-amp comparator changes its output state in response to the instantaneous voltage difference between its inverting input and its non-inverting input. Resistors coupled to the inputs and output of the op amp (such as shown in the diagram of FIG. 3g) provide hysteresis to prevent multiple output transitions should the input contain noise. This circuit changes its output when the RC node output signal crosses the reference voltage at the inverting input. The variable amplitude, variable phase signal present at the inverting input is converted to a constant large amplitude square wave with fast edges. Thus, phase information is well preserved and this sharp digital signal is compatible with the XOR phase detector. In other embodiments, other types of phase detection circuits can be used, as is well known to those skilled in the art.

In addition, measurement of the phase shift between the driving signal and the RC node output signal must not load or otherwise interfere with the AC response of the RC circuit. Op-amp comparators have very high input impedance and do not interfere with the RC circuit.

The output of the phase detection stage (e.g., XOR gate) may be converted into a voltage by using a low-pass filter. This filter, for example, can be a second-order Butterworth type, including capacitors in parallel and inductors in series with the output voltage. The variable duty cycle phase detector output (from the XOR gate) is converted to a voltage signal which is responsive to the vane position. This signal is suitable for input to an A/D converter. Practical systems tested have resolved this signal to one part in 800, nearly 10 bits.

Practical Embodiment

What has been described so far is a single vane, single stator position sensor with one voltage output. This arrangement can produce an output position signal shaped like the Arctangent function governing the RC phase shift circuit.

Error can be introduced into the capacitive sensor if only one output circuit and node are provided. Any change in the dielectric material, drive signal frequency, or gap (distance d) between the plates causes the output voltage to change and this change can falsely appear to be a positional change of the vane. It is clearly advantageous to provide two separate measurement mechanisms in order to separate effects that happen to both mechanisms equally. For example, a duplicate position sensor with its vane physically coupled to the first vane and including a duplicate circuit can be provided. Any change in gap, drive signal frequency, etc. will affect both position sensors and result in equal signal changes at both low-pass filter outputs. This common mode signal is present on both low-pass outputs.

If the vanes and stators are geometrically arranged in such a way that movement decreases one signal while increasing the other, then a differential position signal results. The differential position is proportional to the difference in low-pass output signals. By taking the algebraic difference between the two low-pass signals, the common mode effects of gap variation, drive signal frequency variation, etc., are subtracted out. This is the preferred embodiment.

Figure 3A:
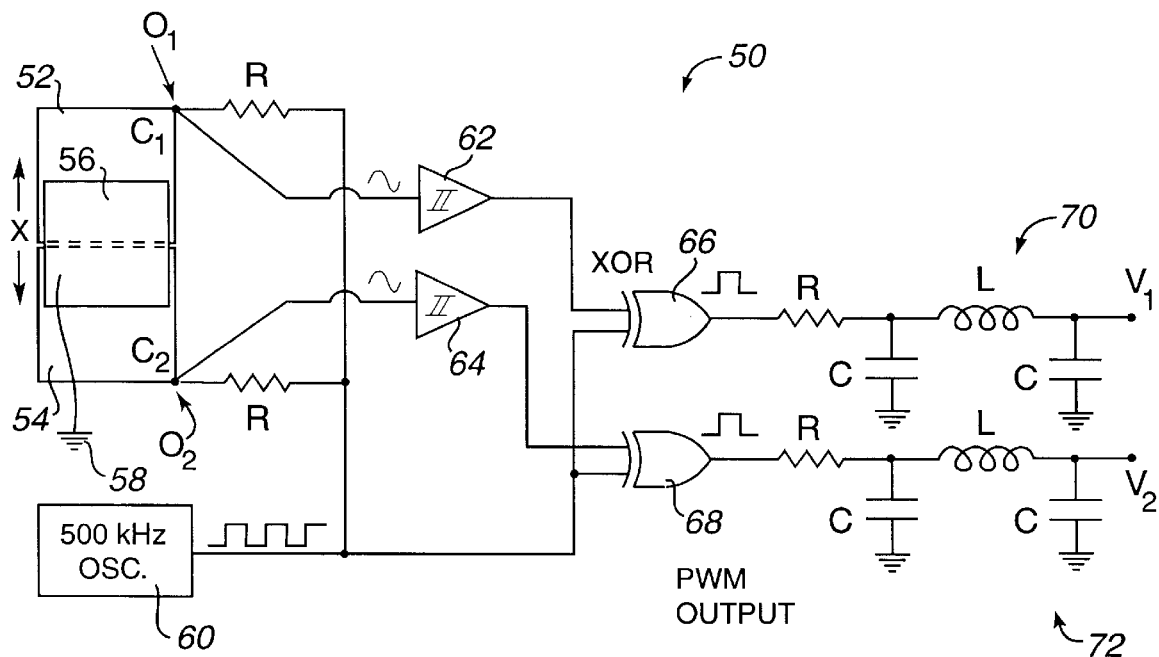
FIG. 3a is a schematic diagram of a practical embodiment of the sensor of the present invention.

An example of a circuit 50 implementing the preferred embodiment is shown in FIG. 3a. Capacitors C1 and C2 each include a stator 52 and 54, respectively, formed adjacent to the stator of the other capacitor in a planar arrangement. Each stator 52 and 54 is connected to an RC output node O1 and O2, respectively, of the circuit. The two adjacent stator plates are bridged by a single vane 56 that is connected to ground 58. This arrangement forms two real variable capacitors C1 and C2 which each include a resistor R1 and R2 for an RC circuit. The vane 56 is moved linearly across the stators 52 and 54 to produce a phase shifted output signal at each RC output node O1 and O2. Thus, in the embodiment shown, the linear position along a single axis X of the vane is detected, i.e. a single degree of freedom.

Both RC circuits are connected such that the vane 56 is ground and the stators 52 and 54 are connected to the resistors R1 and R2, respectively. Electrically, the stators 52 and 54 are the RC output nodes and the signals present on them are the phase shifted versions (resultants of the phasor diagram) of the driving signal present at the resistors. An oscillator 60 provides the drive signal of a desired frequency (e.g. 500 kHz in the described embodiment) for the RC circuits. Resistors R1 and R2 are driven by the same frequency, so any change in frequency is cancelled out.

FIG. 3a also shows the comparator and phase detection stages as described above. Op amps 62 and 64 are coupled to the output nodes O1 and O2, respectively, one for each RC circuit. Phase detection XOR gates 66 and 68 are coupled to the outputs of the op amps 62 and 64, respectively. Butterworth filters 70 and 72 are coupled to the outputs of the gates 66 and 68, respectively. For example, filter 70 can include resistor R3, two capacitors C, and inductor L in the low-pass configuration shown. Filter 72 can similarly include resistor R3, capacitors C, and inductor L. The output signals V1 and V2 output from the filters 70 and 72, respectively, are each produced from one of the RC circuit stages and are subtracted to provide the differential output described above. The output function V(x) of the circuit is equal to k(V2−V1), where k is a constant set by the difference op-amp circuit gain.

Additional degrees of freedom can be added in other embodiments. For each degree of freedom, a stage of capacitors and circuit of FIG. 3a is preferably used (except that only one oscillator 60 need be used for all provided degrees of freedom).

Figure 3B:
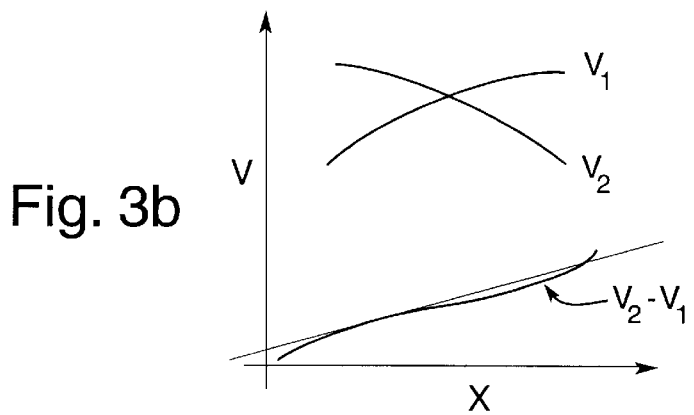

Another major advantage of differential measurement is that it linearizes the sensor output. As shown by the graph of FIG. 3b, two non-linear segments of Arctangent functions (V1 and V2) subtracted from each other produce a nearly linear output (V2−V1). This differential signal linearity is strongly governed by the values of R=R1=R2. R also sets $d\theta/dX_c$ which is the dynamic range (resolution) of the sensor. The amount of phase shift provided for a given change in capacitance is determined by the location on the Arctan function governed by the resistance R (see FIG. 2b). Differential measurement also eliminates second order and other (even order) polynomial terms from the low-pass outputs (if modeling with polynomials).

The capacitive circuit device of the present invention differs from conventional variable capacitance measurement circuits because it is based on detecting the phase change imparted to an AC signal by the capacitor. The common and more expensive way to sense changing capacitance is to measure charge stored in the capacitor. The difficulty in the charge approach is that very small charges are being measured and this requires very elaborate electronics which can be cost prohibitive for high volume consumer products. Charge sensitive electronics are far more susceptible to stray capacitance and E fields from interference sources and thus suffer from poor signal to noise performance. The phase detection method of the present invention permits driving the capacitor with a high current signal and measuring a high current signal. These large signals are easy to measure and are not as responsive to interference as the signals used by charge sensitive electronics. The electronics that detect reactance are unresponsive to small charges or stray fields because the impedances are too low to develop measurable signals from this noise.

In a different embodiment, two vanes and one stator can be used to provide the two capacitors used for the differential measurement described above. For example, the two vanes can be fixed a constant distance apart relative to each other and move in a plane over a single stator to which the dielectric layer is attached. Each of the two circuit outputs would be coupled to one of the vanes.

Figure 3C:
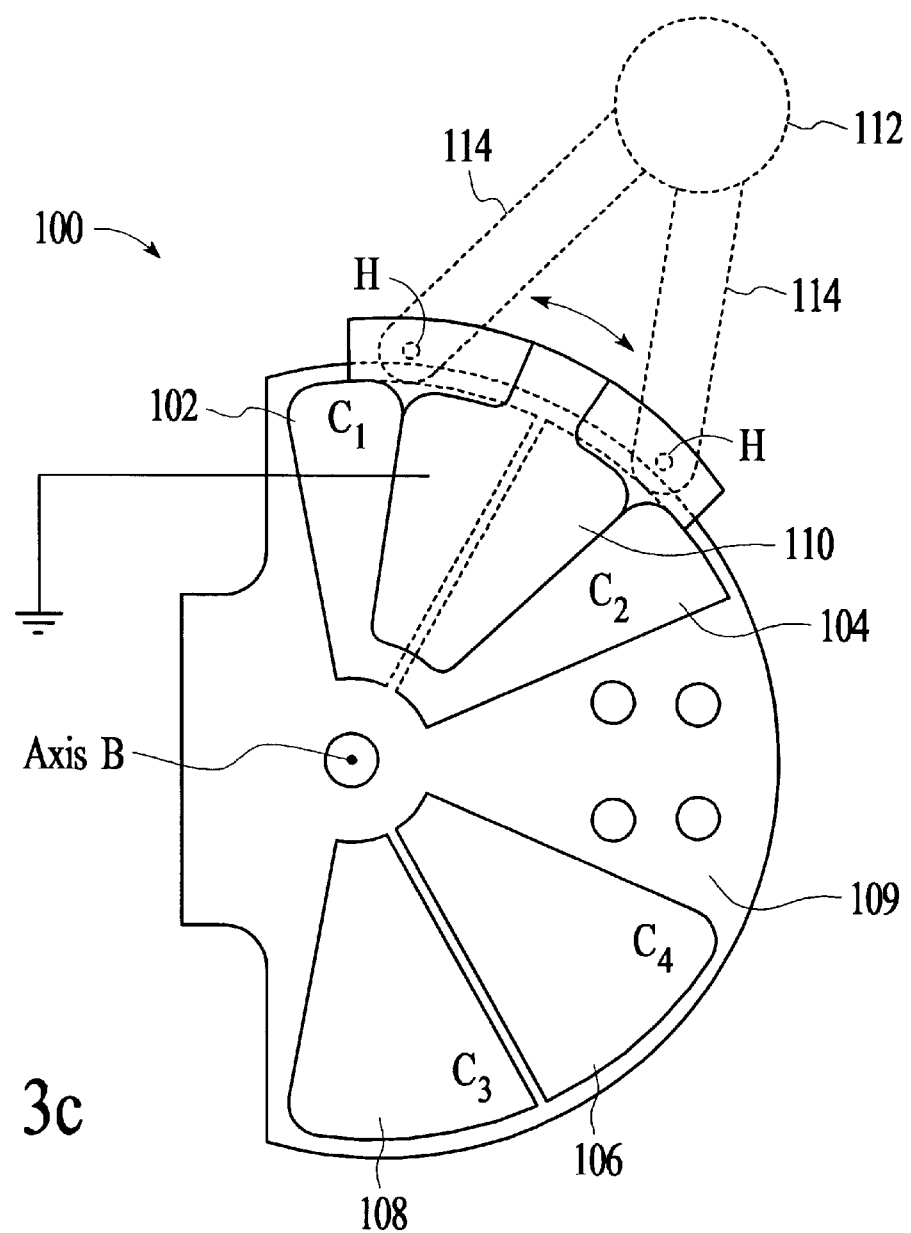
FIGS. 3c and 3d are top plan and side elevational views, respectively, of a different embodiment of the capacitor portion of the sensor of the present invention in which rotational motion is sensed.

FIGS. 3c (top view) and 3d (side view) illustrate another embodiment 100 of the position sensor of the present invention. While the sensor shown in FIG. 3a senses linear motion, the sensor of FIGS. 3c–3d senses angular or rotational motion. The stators 102, 104, 106, and 108 can be traces on a fixed PCB 109 and the vane 110 can be a smaller PCB with a conductive trace and dielectric 107 coupled to it such that the dielectric is positioned between vane and stators. The vane 110 is rotated about axis B over the stators 102 and 104 of capacitors C1 and C2 similarly to the linear embodiment of FIG. 3a to produce the phase shifted signal at the output node of the RC circuit. It should be noted that the resistor R in the RC circuit can be provided in any of the embodiments herein as a discrete component (such as a surface mount device) or can be etched on the PCB, for example, as a thick film. A member or other structure having movement about axis B whose position is to be sensed (as described below) can be coupled to the vane 110 at holes H, if desired.

In other embodiments, the geometry of the stators and/or vane can also be adjusted in the linear or rotational motion embodiments. For example, the geometry can be changed to shape the output function of the sensor to a desired form, the output function being the relation between mechanical input motion and the output signal. Furthermore, the PCB portions 102 and 104 can be moved (thus becoming vanes) with respect to a stationary PCB and dielectric 110 (thus becoming a stator), if desired.

Capacitors C3 and C4 are provided for a second degree of freedom, including two stators 106 and 108 and a vane similar to vane 110 for capacitors C1 and C2 (no vane is shown for capacitors C3 and C4 in FIG. 3c). The stators 106 and 108 for capacitors C3 and C4 can be included on the same PCB board 109 as the stators 102 and 104 for capacitors C1 and C2. The electronics in the circuit of FIG. 3a can be provided, for example, on the back side of the same PCB board 109, as shown with respect to FIG. 3f described below.

A user manipulandum 112 can be coupled to the vane 110 by a linkage 114. The manipulandum can be any of a variety of objects, such as a joystick handle, mouse, steering wheel, grip, etc. The position of the vane in its degree of freedom represents a position of the manipulandum in its degree of freedom. Linkage 114 can be a simple mechanical connection or can be a multi-bar linkage, e.g. having members rotatably coupled together. The manipulandum is preferably also coupled to the vane (not shown) over capacitors C3 and C4 to allow sensing in two degrees of freedom of the manipulandum.

Figure 3D:
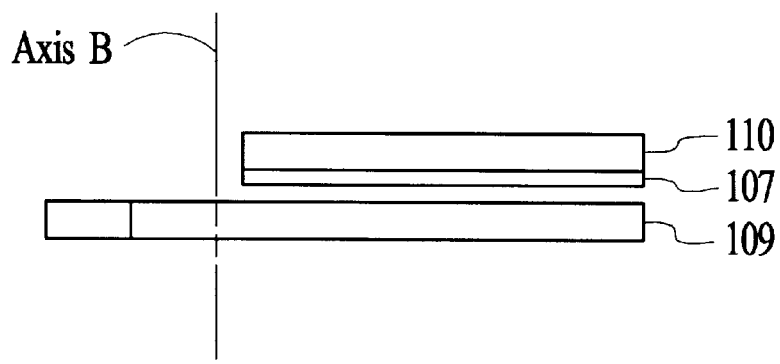
Figure 3E:
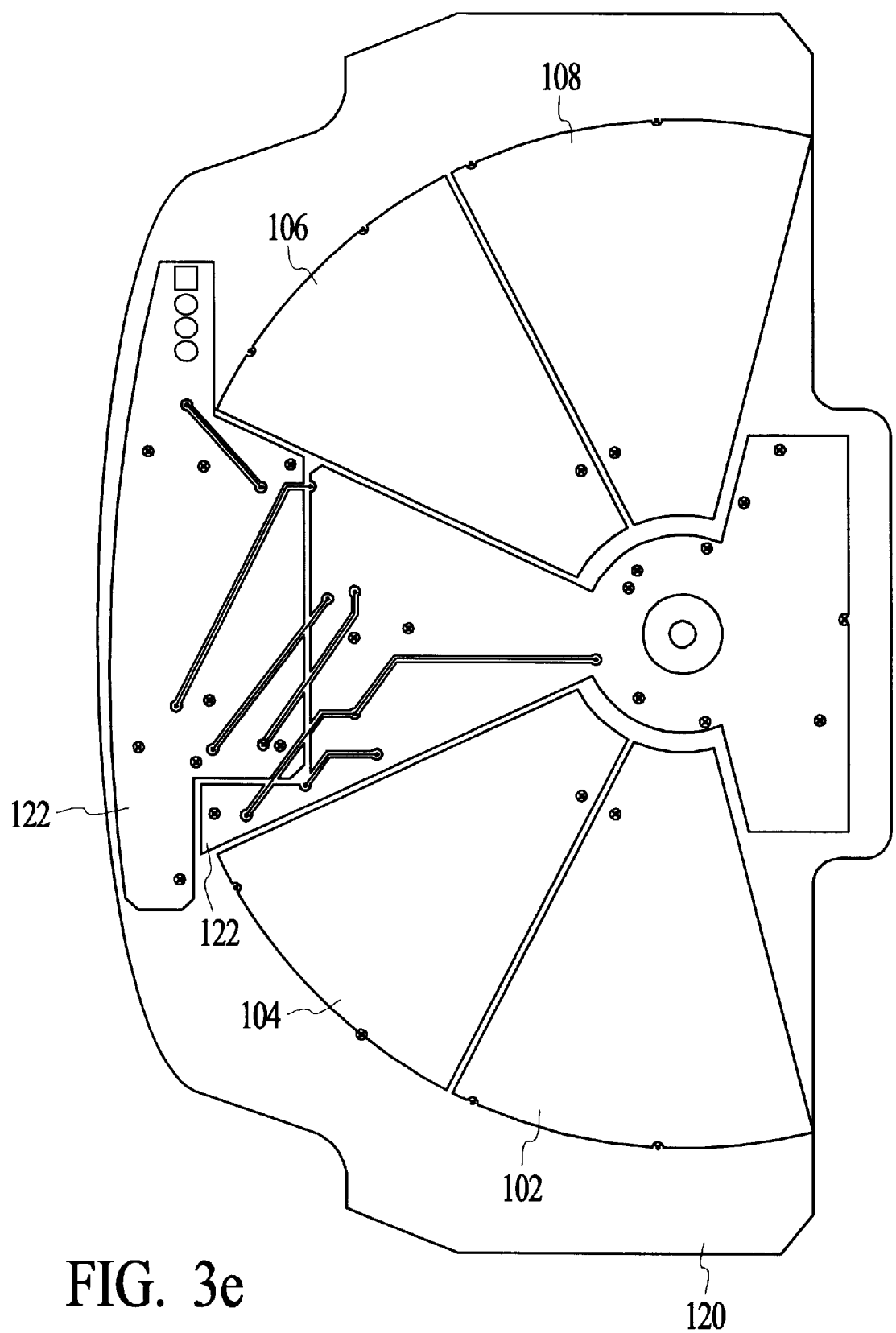
FIG. 3e illustrates a printed circuit board including the stators for the capacitive sensor of the present invention.
Figure 3F:
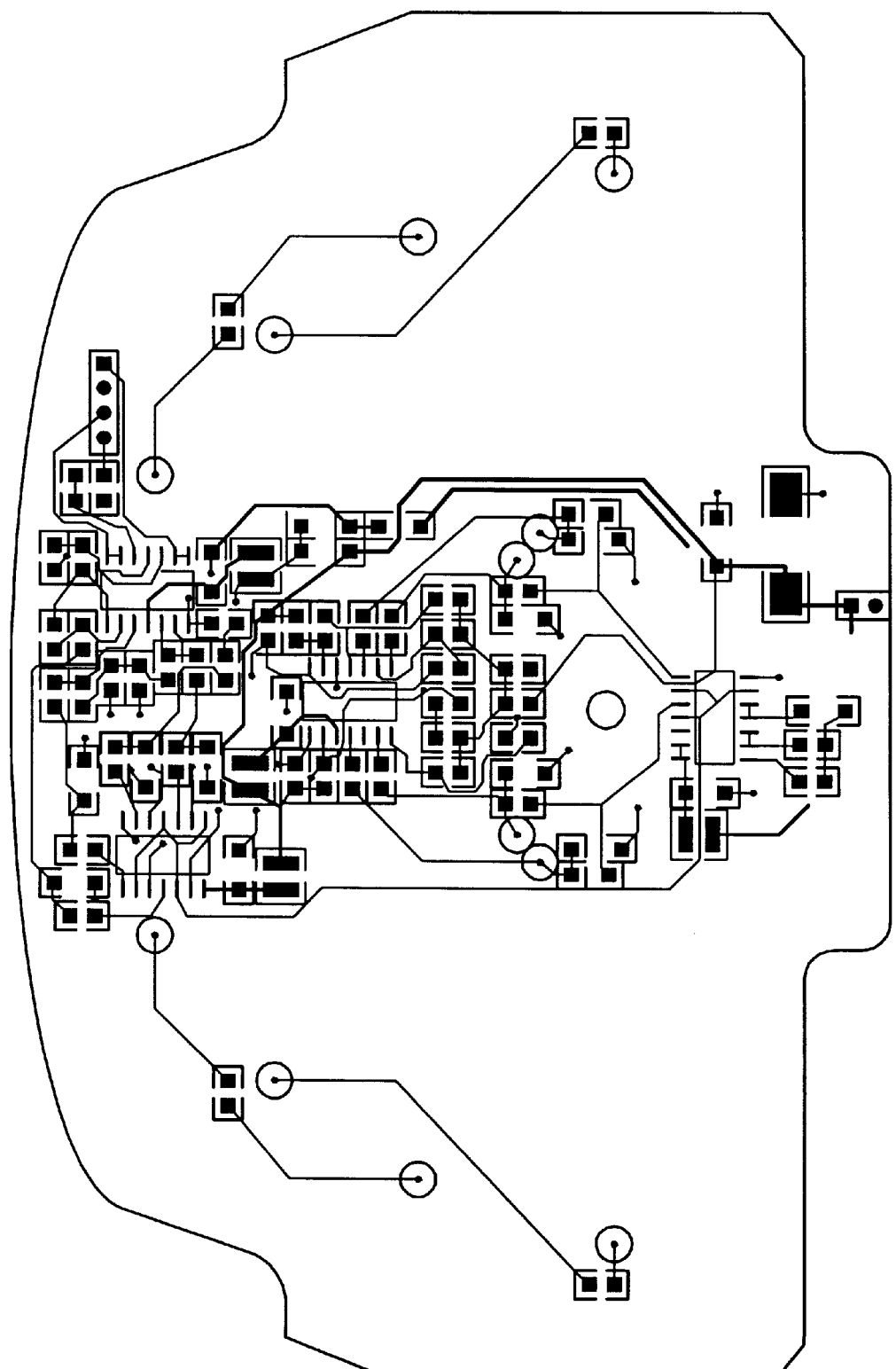
Figure 3G:
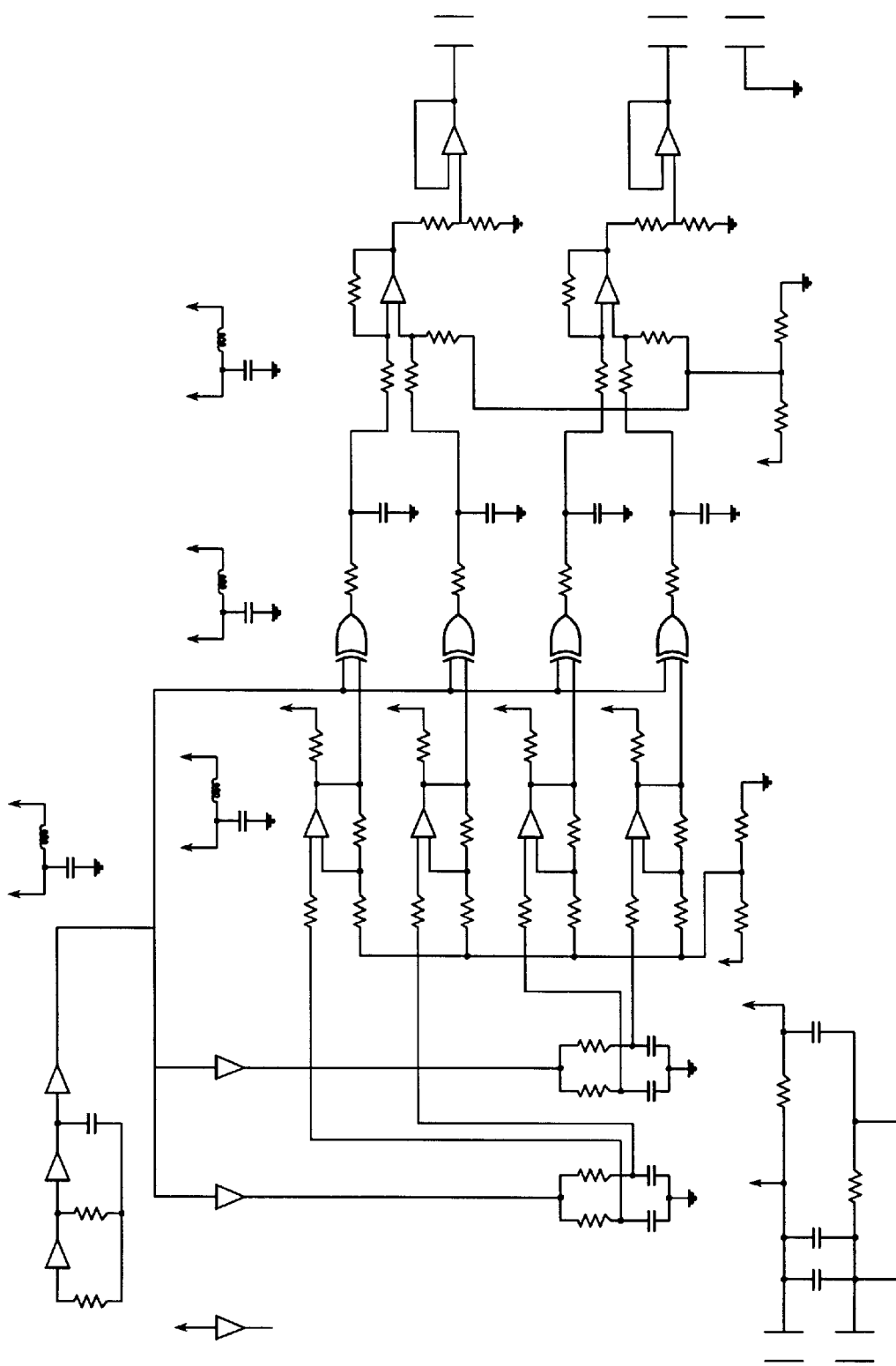
FIG. 3g is a schematic diagram illustrating the circuit of FIG. 3f.

FIGS. 3e–3g illustrate a more specific example of the embodiment of the position sensor shown in FIGS. 3c–3d. FIG. 3e illustrates a PCB 120 including the stators 102, 104, 106 and 108 for the capacitors C1–C4 as shown in FIG. 3c and ground planes 122 etched on the PCB 120.

FIG. 3f illustrates an example of a circuit layout to implement the circuit shown in FIG. 3a. This layout is preferably provided on the back side of the PCB 120 shown in FIG. 3e. The layout preferably includes surface-mount devices which are arranged as such to minimize parasitic electromagnetic interference with the operation of the circuit caused by other devices on the PCB 120. FIG. 3g is a schematic illustration of the circuit shown in FIG. 3f. Other circuits and layouts can be provided in other embodiments.

The low-pass voltages V1 and V2 (see FIG. 3a) can be read directly by a processor or microcontroller and then subtracted to derive a measurement of position. It is possible to use an analog circuit to subtract the signals, but this may reduce resolution by adding to the noise on the signal. For example, the low pass outputs of the circuit of FIG. 3a may have <5 mV of noise (ripple), but an op amp stage can double this noise.

A microprocessor can directly measure a pulse width modulated signal (output of the XOR gate) which is linearly proportional to the position of a moving part in relation to a fixed ground, e.g. the printed circuit board 109 or 120 can be the fixed ground. The same processor/electronics can be used to resolve linear position in translation or angular position in rotational motion. Prototypes are capable of resolving movement within a one inch workspace with 10 bit resolution and less than 5% non-linearity.

Thus, a low-cost, high-resolution, absolute position sensor is provided using simple printed circuit board material and electronics suitable for high volume production. Such an absolute position sensor can be used in any of several different types of devices. For example, any device requiring a position sensor can be used, such as a rotary knob for controlling a function of a device. In other embodiments, input interface devices that are connected to a computer are used to input the position of a user-manipulated physical manipulandum to the computer. The computer processes the input data and outputs feedback in response to the position input. Such input devices are commonly provided in the form of mice, styluses, tablets, joysticks, trackballs, steering wheels, and other devices. Any of such devices can be provided with an absolute sensor of the present invention to provide position inputs in provided degrees of freedom. For example, a mouse or joystick having two degrees of freedom can include the position sensor for each degree of freedom. The sensing accuracy and resolution of the position sensors of the present invention is ideal for precision devices. One type of precision device is a force feedback interface device, which senses the manipulandum and outputs forces on the manipulandum using actuators correlated to the position of the manipulandum and to events implemented by the computer. Force feedback devices require high position sensing accuracy of the manipulandum so that forces can be accurately and realistically output to the interface device; with less sensor resolution, the performance of the force feedback device is degraded.

One embodiment for use with the sensor of the present invention includes a force feedback mouse interface device. Such a device must sense fine motion of the mouse to control a mouse pointer displayed by a host computer in a graphical user interface (GUI) or other graphical environment. When force feedback is used in conjunction with such fine positioning, the need for a high-resolution sensor is greatly increased, since the accuracy and realism of the forces output on the mouse are highly dependent on precise current and previous positions of the mouse in its workspace. One such mouse suitable for use with the present invention is described U.S. Pat. No. 6,100,874 and in copending patent applications Ser. No. 08/965,720, incorporated by reference herein. Another example of the architecture for a force feedback device is described in U.S. Pat. No. 5,734,373, incorporated herein by reference. For example, the vane can be coupled to a moving part such as a rotating member in a moveable linkage, and the stator can be fixed with respect to ground. The linkage can be coupled to the mouse that is grasped by the user; for example, a closed-loop five bar linkage can be provided, where the multiple members of the linkage are rotatably coupled to each other. The sensor of the present invention allows highly precise and accurate position sensing to be provided in a low cost, high volume, mass market device such as a force feedback mouse interface.

Alternate Embodiments

Figure 4:
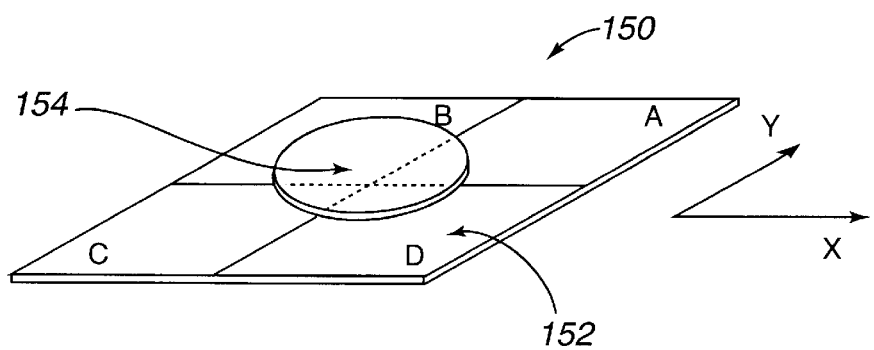
FIG. 4 illustrates an alternate embodiment of the sensor system of the present invention which includes a four quadrant stator array with a moveable circular vane.

FIG. 4 illustrates an alternate embodiment 150 of the sensor system of the present invention which includes a four quadrant stator array 152 with one moveable circular vane 154. The same electronics are used as described above, but there are now four RC, XOR, comparator, and low-pass circuits. Each stator A, B, C, and D provides a separate output voltage. The four output voltages may be read by the processor to derive Cartesian position by taking the difference of the sums of adjacent quadrants.

For example, if there are four quadrants labeled A, B, C, and D, then the Cartesian positions X and Y can be determined as follows:

$X=(A+D)-(B+C)$ and $Y=(A+B)-(C+D)$

These calculations can be performed by a microprocessor or other controller receiving the position signals. There are other advantages to having the processor do the calculations. A four quadrant position detector can involve many analog summation and difference circuits, but four raw voltages, or pulse widths, are easily read and manipulated by the processor.

The circular vane eliminates any undesired effect due to vane rotation. The linearity performance of this arrangement is a function of vane diameter with respect to the individual stator unit quadrant size. This relationship and the resulting geometry can be used with an input interface device for a computer as described above, e.g. an absolute pointing device measuring absolute position of a physical object with respect to a device frame to control or modify data on the host computer, such to control a mouse cursor positioned in a screen frame proportionally to the position of the physical object in the device frame.

The application of the technology of FIG. 4 relies on operating within a range of critical physical parameters. The physical size of the matrix (area of stator and vane, thickness of dielectric) dictates the operating frequency and the value of R is adjusted by design to stay within a region of linear operation. Dynamic range is driven by the ratio of the maximum and minimum overlap areas of the vane electrode with the stator electrode. Practical sensors can operate with an area ratio (maximum overlap area to minimum overlap area) of 10:1.

FIGS. 5a–5d illustrate another embodiment of the present invention, in which interdigitated stators are provided. The sensor configuration with two adjacent stators, as described above, may be modified by subdividing each stator into equal width parts or portions. The vane can be sized such that it is the width of one stator portion. For example, two of the adjacent stators described above can be provided as four adjacent stator portions. Or, three adjacent stator portions can be provided to cover the same angular range as two adjacent stators of FIG. 3c. If alternate stators are electrically connected, a two-electrode stator results (i.e., two electrical stators, regardless of how many stator portions are mechanically interdigitated). This geometry may be extended to any even or odd number of stators within a given linear or angular region.

The previously-described embodiment of FIG. 3c for providing two adjacent stators is shown in FIG. 5a, where the vane 110 is moved relative to stators 102 and 104. Input signals $S_A$ and $S_B$ and resistors R are also connected. The electronics used to derive a position signal from two adjacent stators provide a single slope output, where the voltage difference (V2−V1) is derived from the two low-pass voltages V1 and V2. The single slope output is shown in FIG. 5b.

Interdigitating stators results in a position output which has more than one slope. FIG. 5c illustrates an example of a position sensor 160 having three interdigitated stator portions 162, 164, and 166, covering the same angular range as the stators of FIG. 5a, and a vane 168. The three stator portion geometry results in two electrical stators, since signal $S_A$ is coupled to both portions 162 and 166, and provides a two slope position signal, as shown in FIG. 5d. In similar fashion, a four stator geometry will provide a three slope position output, and so on.

Since the electronics provide a full scale output voltage each time a pair of stators is traversed by the vane, multiple full scale output swings result. This effectively doubles, triples, or quadruples the position resolution depending on the geometry. For instance, if we are using a 10 bit A/D converter and we have a three stator geometry, then the resulting position difference signal will have two slopes, and will run through 10 bits of A/D counts twice for a given movement of the vane across the three stators (across the full angular or linear range of the stators). This doubles the bits of resolution to achieve 11 bits of position data using the same sensor area. Using four stators gives three output slopes and 11.5 bit resolution—three 10 bit resolved sections.

Several design considerations need to be addressed for this implementation. First, the capacitance of the stator/vane combination is reduced if the stators are bisected or otherwise divided. This requires an adjustment in the operating frequency. Secondly, this division of the stator sectors increases edge effect contribution to overall sensor performance. How much division is practical depends on the vane/stator capacitance and the edge effect contribution to non-linearity.

Figure 6:
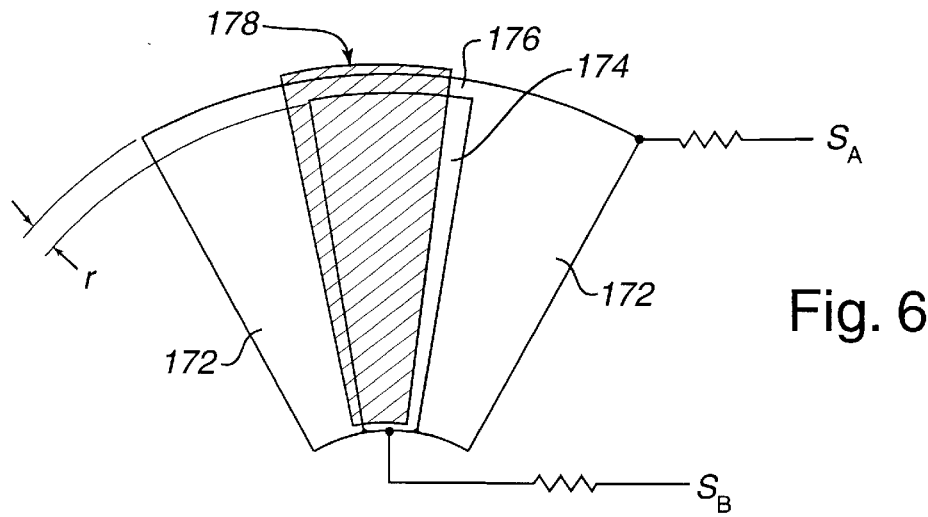
FIG. 6 illustrates an embodiment of the present invention having a connecting strip between sections of a stator.

FIG. 6 illustrates an embodiment 170 having a connecting strip or bridge connected two separated portions of a stator. When a vane is equal in width to a stator, then a small dead band may be exhibited when the vane exactly overlaps a stator, i.e. since the vane is only over a first stator, the output of a second adjacent stator is indeterminate at this time and may cause nonlinearity or distortions (such as flat signals) at or near the endpoints of the slope line of FIG. 5a or 5d. One way to reduce this dead band is shown in FIG. 6, where stator 172 of one electrical node is arranged to be surrounding a second stator 174 of a different electrical node, such that two portions of the stator 172 are on opposite sides of the stator 174. The stator 172 can include a section or connecting strip 176 extending between the separated portions that is always under the vane 178 such that some signal is always present from stator 172. Thus, in the rotary motion embodiment shown in FIG. 6, the radius (measured to the axis of rotation) of stator 174 is less than the radius of stator 172. The connecting strip 176 can be provided at any location under the path of the vane. In alternate embodiments, a three-stator embodiment (such as shown in FIG. 5c) can include stators surrounding a middle stator, where the surrounding stators each have a portion extending into the region of the middle stator, e.g. each surrounding stator can have a strip 176 or a portion of strip 176.

Multi-pole Capacitive Sensors

Figure 7A:
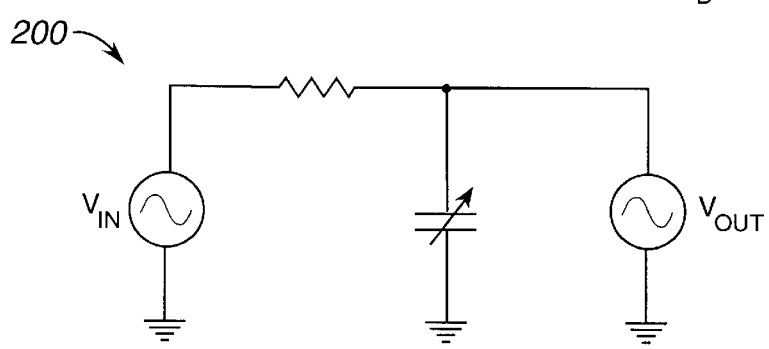
Figure 7B:
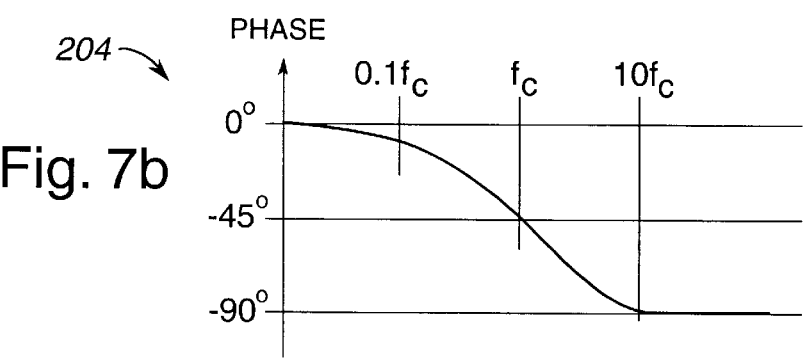
Figure 7C:
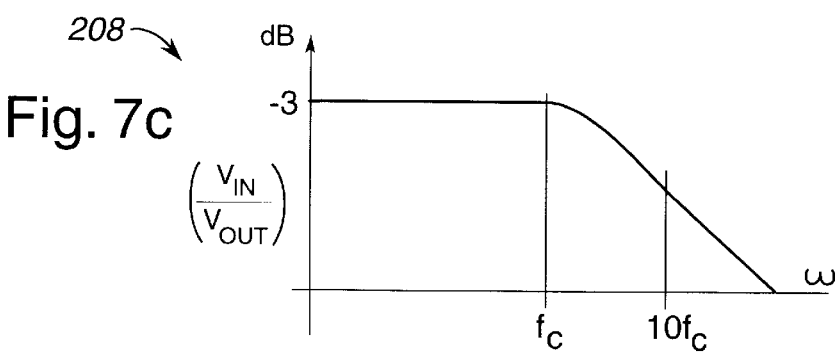

A different embodiment of the present invention uses multi-pole, parallel capacitors. The sensor electronics described so far may be analyzed as a simple RC low-pass circuit 200, as shown in FIG. 7a, since a capacitor is being driven with a signal source through a resistor and the resultant output signal is measured. The amplitude and phase are a function of the frequency and the component values. A phase diagram 204 and an amplitude diagram 208 for the RC low pass circuit 200 are shown in FIGS. 7b and 7c, respectively. The single-pole RC filter attenuates the input signal at a rate of −20 dB/decade and shifts the phase of the input signal from zero to 90 degrees depending on the frequency and the capacitor value. Since the phase detector derives a linear voltage from a phase shift, the magnitude of the output voltage can be increased by increasing the phase shift.

Filters having multiple poles may be used to increase the phase shift and thus the dynamic range (resolution) of the position sensor. Sliding capacitor plates can be used to form a two or three-pole filter, as described below.

Figure 8A:
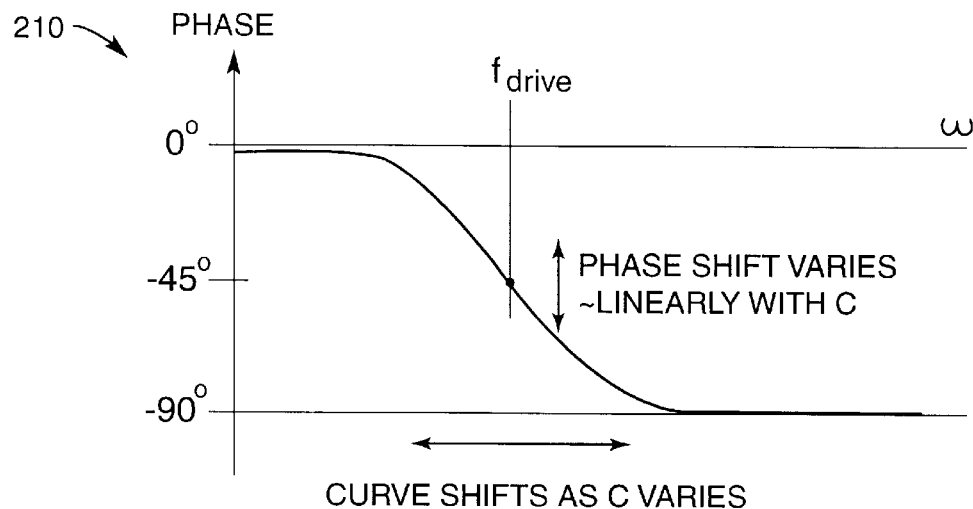
FIGS. 8a, 8b and 8c are phase diagrams showing the response of a single-pole low pass filter, a two-pole low-pass filter, and a three-pole low pass filter, respectively.

A single-pole implementation is shown in the phase diagram 210 of FIG. 8a. Capacitance varies as the overlapping area of the two capacitive plates varies. As capacitance varies, the breakpoint (−3 dB point) of the filter varies. The phase response of a single-pole low-pass filter drops from 0 degrees to −90 degrees beginning about one decade below the filter breakpoint frequency, and ending about one decade above the breakpoint frequency.

A signal passed through the filter at exactly the breakpoint frequency of the filter experiences a phase shift of approximately 45 degrees. A signal of slightly lower frequency than the breakpoint will have a smaller phase shift, and a signal of higher frequency will have a greater phase shift. In the region near the filter breakpoint, the phase shift is nearly linear. The present sensing technique uses this linear relationship in a novel way: by shifting the breakpoint of the filter (using the variable capacitor) with a constant frequency input to the filter. The drive signal frequency is chosen to match the cutoff frequency of the filter when the capacitances from the two capacitors are equal, e.g., when the vane of a capacitors is in the center of its overlapping range of motion, equally overlapping the two adjacent stators. As the filter breakpoint varies, the phase response curve shifts left and right. The phase shift of the test signal thus "rides up and down" the shifting phase response curve as it shift left and right (see FIG. 8*a*).

Figure 8B:
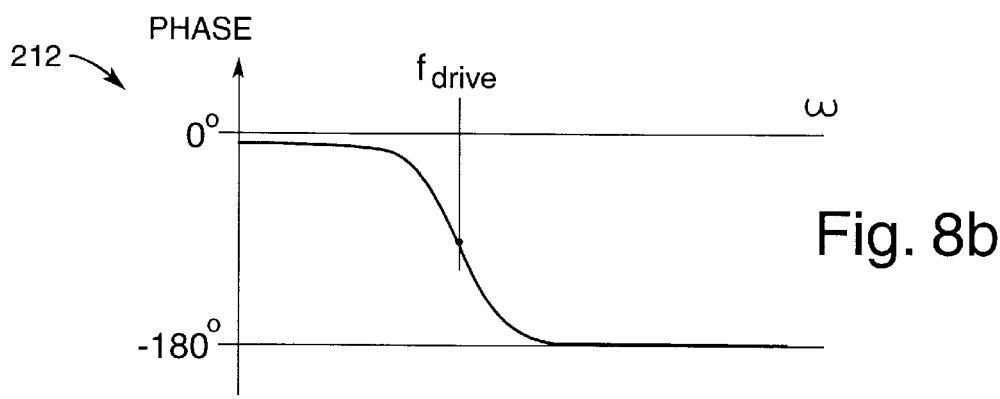
Figure 8C:
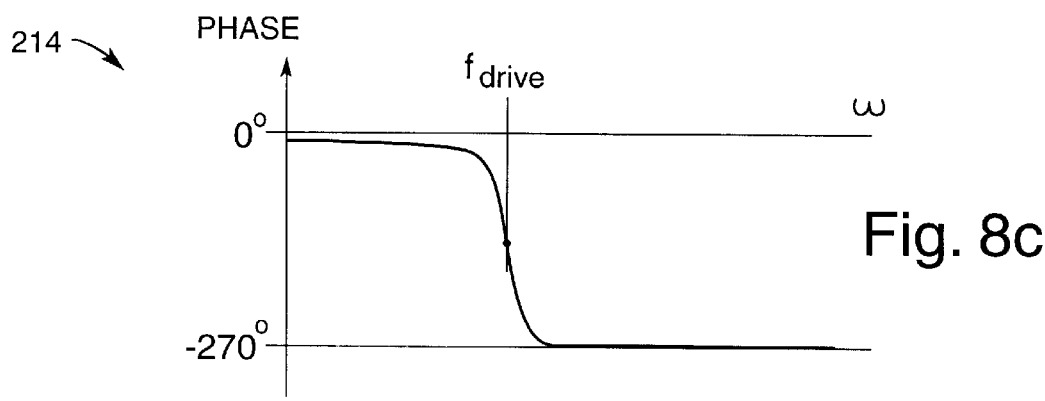

If the slope of the phase response curve were steeper, a given change in the breakpoint frequency would cause a greater phase shift. A phase response curve twice as steep would double the phase shift, and three times as steep would triple the phase shift, for example. The phase diagram 212 of FIG. 8*b* shows a two-pole low-pass filter, which has a steeper phase response change of −180 degrees. The phase diagram 214 of FIG. 8*c* shows a three-pole filter, which has an even steeper phase response shift of −270 degrees. These steeper slopes can be obtained by using a higher-order filter. This enhancement to the invention takes advantage of these facts by using a two or three-pole filter instead of a single-pole filter. The doubling or tripling of the range of the phase output in turn doubles or triples the dynamic range of the sensor.

A two-pole filter requires two capacitors that vary concurrently, and a three-pole filter requires three capacitors that vary concurrently (in general, an N-pole filter will require N capacitors). This requires a more complicated arrangement of moving plates, e.g. a two pole filter requires that each degree of freedom sensed include two vanes and two stators. Examples below are given for the two-pole case.

Figure 9A:
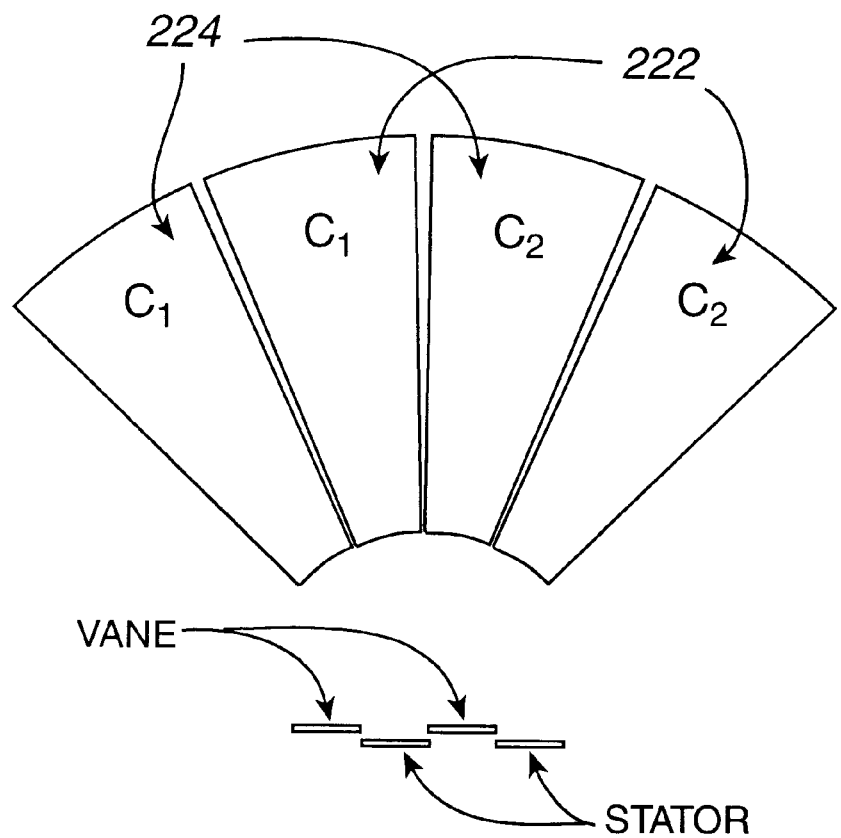
FIG. 9a shows a sensor embodiment of the present invention that provides two variable capacitors arranged mechanically in parallel, and electrically connected as part of a two-pole low pass filter.
Figure 9B:
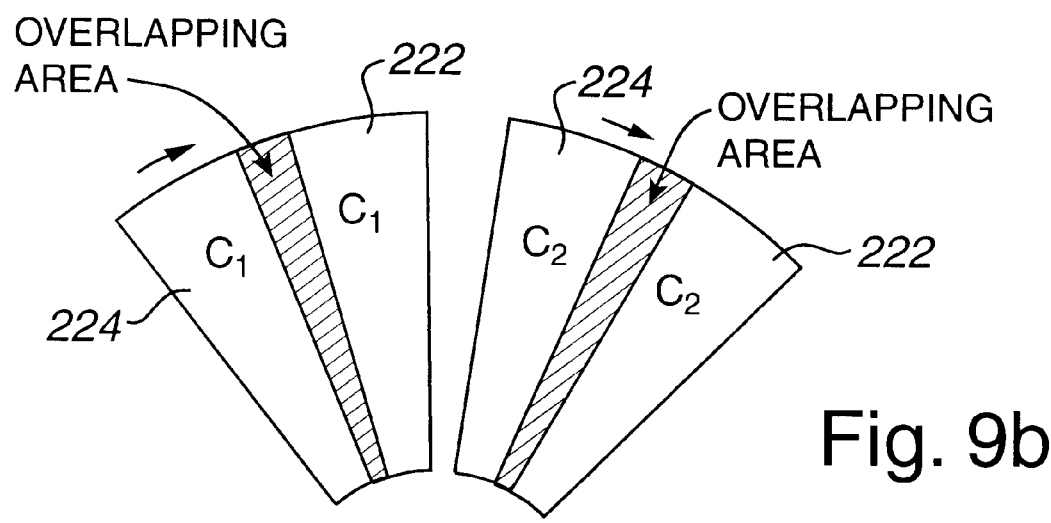

FIG. 9*a* shows an embodiment 220 that provides two variable capacitors arranged mechanically in parallel, and electrically connected as part of the two-pole low pass filter. The plate arrangements of capacitors C1 and C2 include a stator 222 and vane 224 for each capacitor. FIG. 9*b* illustrates the motion of each vane 224 over its corresponding stator 222 and the overlapping areas. This type of sensor can include either a passive filter (requiring careful design) or an active filter (requiring a very fast operational amplifier). Furthermore, assuming that a single-pole implementation would have used all the available plate area, a two-pole implementation has half the plate area per capacitor, requiring a doubling in the drive frequency to obtain proper performance (as explained above).

Figure 10A:
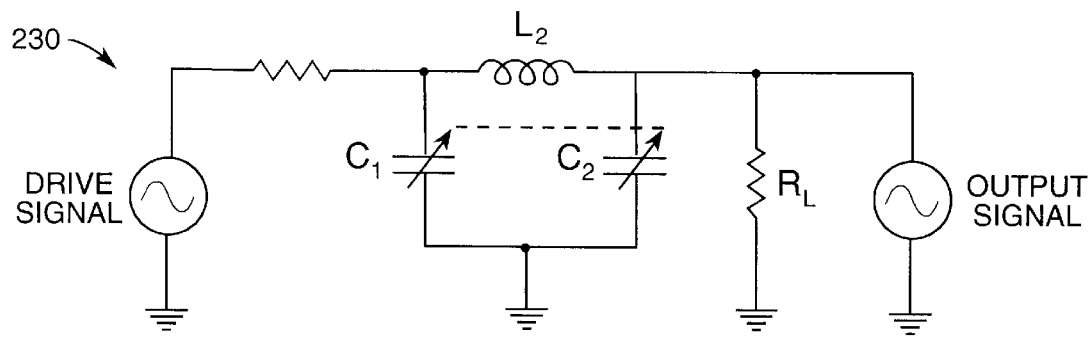
FIGS. 10a and 10b are a schematic showing a passive two pole filter circuit for the sensor of the present invention and its resulting phase diagram, respectively.
Figure 10B:
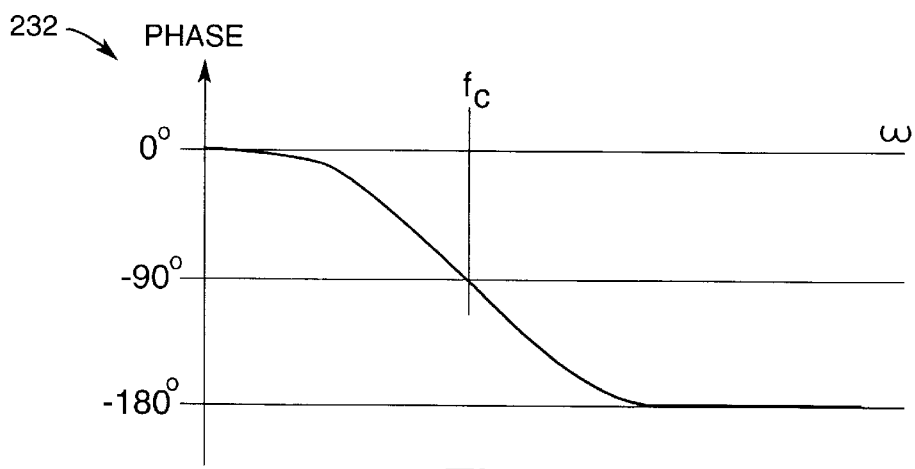

FIG. 10*a* is a schematic showing a passive two pole filter circuit 230 for the sensor of the present invention composed of an inductor and two variable capacitors (a pi network) may be used to achieve up to 180 degrees of phase shift. The resulting phase diagram 232 is shown in FIG. 10*b*. Both capacitors C1 and C2 are of equal value and are mechanically coupled such that they both change in capacitance the same amount for a given position change. For example, the vanes of the two capacitors may be physically coupled so that they move in unison over corresponding areas of the stators. This embodiment may have higher resolution and lower noise than the single pole design. The added cost of an inductor may be justified by doubling the effective resolution.

Figure 10C:
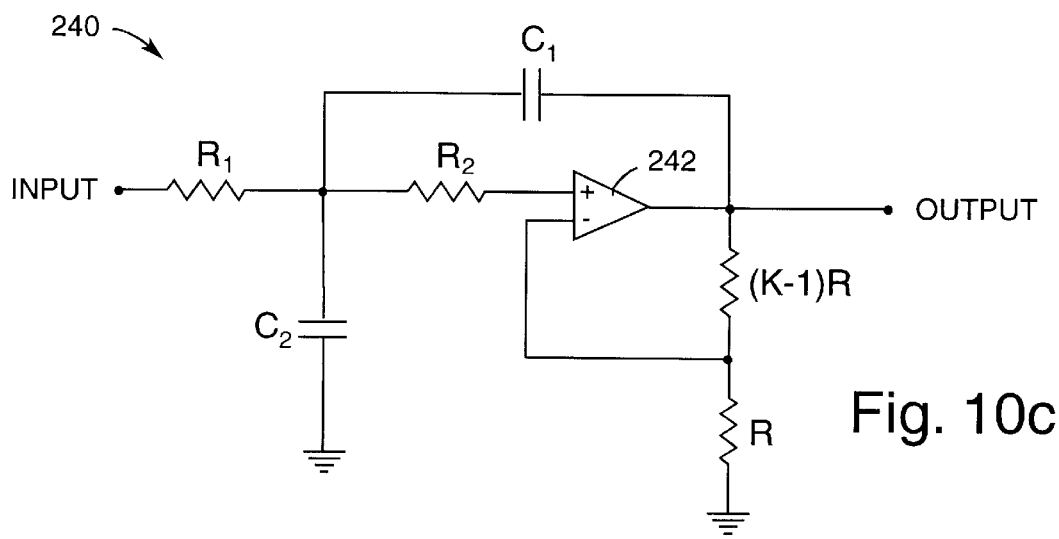
FIG. 10c is a schematic diagram illustrating an active low-pass filter circuit for a two-pole case of the present invention.

FIG. 10*c* illustrates an example of an active low-pass filter circuit 240 for a two-pole case. In the active case, the operational amplifier 242 should function with high fidelity at high frequencies (e.g. hundreds of kilohertz for force feedback applications).

The multi-pole enhancements described above can double or triple the dynamic range of the sensing technology. Costs or disadvantages can include doubling (or tripling in a three pole case) the drive frequency, a more complicated plate design (e.g., providing one or more additional electrical contacts to the additional vanes in the active filter case, since both capacitors in the filter do not have a grounded lead, and thus an additional wire must be connected to the vane), and increased parts cost (op-amps or passive components for higher-order filters). For example, an op amp with a desired high frequency response typically costs more than op amps with lower frequency response.

While this invention has been described in terms of several preferred embodiments, there are alterations, modifications, and permutations thereof which fall within the scope of this invention. It should also be noted that the embodiments described above can be combined in various ways in a particular implementation. Furthermore, certain terminology has been used for the purposes of descriptive clarity, and not to limit the present invention. It is therefore intended that the following appended claims include such alterations, modifications, and permutations as fall within the true spirit and scope of the present invention.

What is claimed is:

1. A capacitive position sensor comprising:

a first stator and a second stator, each of said first and second stators coupled to a driver signal input to allow a driver signal to be input to said first and second stators;

a resistor coupled between said driver signal input and said first stator;

a vane, wherein said vane moves parallel to said first stator such that said vane overlaps at least a portion of said first stator, thereby creating a capacitance that varies as said vane moves;

a dielectric provided between said vane and said first stator; and a circuit coupled to said first stator, said circuit sensing a voltage on said first stator based on relative positions of said first stator and said vane, said circuit providing a phase-shifted signal describing a phase shift of said voltage with reference to said driver signal, said phase shifted signal suitable for deriving an absolute position of said vane with respect to said first stator.

2. A position sensor as recited in claim 1 wherein said phase shift is based on a degree of overlap of said first stator by said vane, thereby indicating a position of said vane relative to said first stator.

3. A position sensor as recited in claim 1 wherein said vane and said first stator are each positioned approximately within a plane, said planes being parallel to each other.

4. A position sensor as recited in claim 1 wherein said first stator and said vane are approximately planar in shape.

5. A position sensor as recited in claim 4 wherein said first stator is provided on a printed circuit board.

6. A position sensor as recited in claim 1 wherein said driver signal is an AC signal provided by an input circuit including an oscillator.

7. A position sensor as recited in claim 1 wherein a user manipulandum is coupled to said vane such that a position of said user manipulandum can be determined based on said position of said vane with respect to said first stator.

8. A position sensor as recited in claim 3 wherein said vane moves within said plane in which said vane is positioned with respect to said first stator.

9. A position sensor as recited in claim 1 wherein said vane moves about an axis in a rotary degree of freedom with respect to said first stator.

10. A position sensor as recited in claim 1 further comprising a circuit that receives said phase-shifted signal and outputs a pulse width modulated signal which is linearly proportional to the position of the vane with respect to the first stator.

11. A position sensor as recited in claim 10 wherein said circuit that receives said phase shifted signal includes an XOR gate.

12. A position sensor as recited in claim 11 further comprising a filter receiving said pulse width modulated signal and producing a filter output signal.

13. A position sensor as recited in claim 1 wherein said second stator is positioned adjacent to said first stator approximately in a same plane as said first stator, wherein said vane moves parallel to said stators and overlaps both of said stators during said movement of said vane.

14. A position sensor as recited in claim 13 wherein said circuit is a first circuit coupled to said stator and said phase-shifted signal is a first phase-shifted signal, and wherein a second circuit is coupled to said second stator to provide a second phase-shifted signal having a phase-shift with reference to said driver signal.

15. A position sensor as recited in claim 14 wherein said second phase-shifted signal increases in amplitude while said first phase-shifted signal decreases in amplitude, and wherein said first and second phase-shifted signals are subtracted to provide a difference signal free of common mode effects.

16. A position sensor as recited in claim 1 further comprising third and fourth stators positioned in a same plane as said first and second stators, and wherein said vane is circular, such that said circuit provides four output signals which are subtracted to provide a two-degree-of-freedom position.

17. A position sensor as recited in claim 1 wherein two portions of said first stator are interdigitated with said second stator such that said two stators are in a range of movement of said vane.

18. A position sensor as recited in claim 1 wherein said first stator, said vane, and said dielectric are provided in a first capacitor, and further comprising a second capacitor, said first and second capacitors providing a multi-pole configuration that increases a dynamic range of said sensor.

19. An interface device including a capacitive position sensor, said interface device being coupled to a host computer and providing input to said host computer based on manipulations of a user of said interface device to manipulate computer-generated objects, said interface device comprising:
(a) a position sensor, including:
  (i) a stator coupled to a driver signal input to allow a driver signal to be input to said stator;
  (ii) a resistor coupled between said driver signal input and said stator;
  (iii) a dielectric provided on one side of said stator;
  (iv) a vane positioned such that said dielectric is between said stator and said vane, wherein said vane moves parallel to said stator such that said vane overlaps at least a portion of said stator, thereby creating a capacitance that varies as said vane moves; and
  (v) a circuit coupled to said stator, said circuit sensing a voltage on said stator based on relative positions of said stator and said vane, said circuit outputting a signal describing a phase shift of said voltage with reference to said driver signal, wherein an absolute position of said vane with respect to said stator is derivable from said signal describing said phase shift; and
(b) a user manipulandum grasped and moved by a user in a degree of freedom, wherein said user manipulandum is coupled to said vane such that movement of said vane corresponds to movement of said user manipulandum in said degree of freedom.

20. An interface device as recited in claim 19 further comprising a mechanical linkage positioned between said user manipulandum and said vane.

21. An interface device as recited in claim 19 wherein said stator and said vane are each approximately positioned in a plane, said planes parallel to each other, wherein said vane moves within said plane in which it is positioned.

22. An interface device as recited in claim 19 further comprising a circuit that receives said phase-shifted signal and outputs a pulse width modulated signal which is linearly proportional to the position of the vane with respect to the stator.

23. An interface device as recited in claim 19 wherein said stator is a first stator, and further comprising a second stator positioned adjacent to said first stator approximately in a same plane as said first stator, wherein said vane moves parallel to said stators and overlaps both of said stators during said movement of said vane, and wherein said second stator is coupled to said drive signal input to allow said driver signal to be input to said second stator.

24. An interface device as recited in claim 23 wherein said circuit is a first circuit and said signal is a first signal, and wherein a second circuit is coupled to said second stator to provide a second phase-shifted signal having a phase shift with reference to said driver signal.

25. A method for sensing the position of a moving member, the method comprising:
providing an input signal having a frequency;
shifting a phase of said input signal by inputting said input signal to a first RC circuit and to a second RC circuit to provide a first phase-shifted signal and a second phase-shifted signal, said first RC circuit including a resistor and a capacitor coupled in series, wherein said input signal is input to said resistor, and wherein said capacitor of said first RC circuit is a variable capacitor having two plates and having a capacitance based on a position of a first one of said plates with reference to a second one of said plates, wherein said relative positions of said plates are determined based on a position of said moving member; and
providing said first phase-shifted signal to a phase detector circuit, said phase detector circuit having a first input coupled at a node between said resistor and said capacitor to sense a voltage at said node and having a second input that is said input signal, said phase detector circuit outputting a pulse width modulated signal which is linearly proportional to the position of one of said plates with respect to the other of said plates.

26. A method as recited in claim 25 wherein said moving member is coupled to one of said plates and to a user manipulandum that is moved by a user.

27. A method as recited in claim 25 wherein said capacitance is based on an amount of overlap of one of said plates by the other of said plates.

28. A method as recited in claim 25 wherein said plates include a vane and a first stator, wherein said second RC circuit includes a second stator, and further comprising subtracting said first phased-shifted signal and said second phased-shifted signal to provide a difference signal free of common mode effects.

29. A method as recited in claim 25 further comprising measuring said pulse width modulated signal with a microprocessor to resolve a position of said moving member.

30. A method as recited in claim 25 further comprising low-pass filtering said pulse width modulated signal to provide an output voltage signal.

31. A capacitive position sensor comprising:
a fixed conductive plate;
a movable conductive plate coupled to a driver signal input to allow a driver signal to be input to said movable conductive plate, wherein said movable conductive plate moves parallel to said fixed conductive plate such that said movable conductive plate overlaps at least a portion of said fixed conductive plate, thereby creating a capacitance that varies as said movable conductive plate moves;

a resistor coupled between said driver signal input and said movable conductive plate;

a dielectric provided between said movable conductive plate and said fixed conductive plate; and a circuit coupled to said movable conductive plate, said circuit sensing a voltage on said movable conductive plate based on relative positions of said fixed conductive plate and said movable conductive plate, said circuit providing a phase-shifted signal describing a phase shift of said voltage with reference to said driver signal, said phase shifted signal suitable for deriving an absolute position of said movable conductive plate with respect to said fixed conductive plate.

* * * * *